United States Patent
Kedia et al.

(10) Patent No.: US 11,636,267 B2
(45) Date of Patent: Apr. 25, 2023

(54) METHODS AND APPARATUS TO GENERATE TEXTUAL DATA USING MACHINE LEARNING PROCESSES

(71) Applicant: Walmart Apollo, LLC, Bentonville, AR (US)

(72) Inventors: Shashank Kedia, Sunnyvale, CA (US); Aditya Mantha, San Jose, CA (US); Stephen Dean Guo, Saratoga, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 176 days.

(21) Appl. No.: 17/162,364

(22) Filed: Jan. 29, 2021

(65) Prior Publication Data

US 2022/0245341 A1   Aug. 4, 2022

(51) Int. Cl.
*G06N 20/00* (2019.01)
*G06N 3/02* (2006.01)
(Continued)

(52) U.S. Cl.
CPC .......... *G06F 40/284* (2020.01); *G06F 40/166* (2020.01); *G06F 40/30* (2020.01); *G06N 20/00* (2019.01); *G10L 15/26* (2013.01)

(58) Field of Classification Search
CPC ......... G06F 40/284; G06N 20/00; G06N 3/02
See application file for complete search history.

(56) References Cited

U.S. PATENT DOCUMENTS

| 10,909,604 | B1 * | 2/2021 | Zappella | G06Q 30/0623 |
| 2019/0311210 | A1 * | 10/2019 | Chatterjee | G06V 20/62 |
| 2020/0293586 | A1 * | 9/2020 | Singhal | G06F 16/9574 |

FOREIGN PATENT DOCUMENTS

CN   111523304   8/2020

OTHER PUBLICATIONS

Devlin, Jacob, et al. "Bert: Pre-training of deep bidirectional transformers for language understanding." arXiv preprint arXiv: 1810. 04805 (2018). (Year: 2018).*

(Continued)

*Primary Examiner* — Jialong He
(74) *Attorney, Agent, or Firm* — Morgan, Lewis & Bockius LLP; Manita Rawat

(57) ABSTRACT

This application relates to apparatus and methods for automatically generating item information, such as item descriptions, and providing the item information to customers. For example, the embodiments may generate and provide personalized item descriptions to customers during conversational interactions in speech-based systems. In some examples, the embodiments determine entities (e.g., attributes) from item information, and apply trained machine learning processes to the extracted entities to generate textual data, such as item descriptions. For example, a computing device may apply a trained natural language processing, such as a trained transformer-based machine learning technique, to the extracted entities to generate the item descriptions. In some examples, the computing device applies post processing techniques to the generated textual data. The generated textual data may include descriptive phrases that are user friendly to customers in an e-commerce system. The textual data can be converted to audio and played to customers.

14 Claims, 9 Drawing Sheets

(51) Int. Cl.
    *G06F 16/248*    (2019.01)
    *G10L 15/22*     (2006.01)
    *G06F 40/284*    (2020.01)
    *G06F 40/30*     (2020.01)
    *G10L 15/26*     (2006.01)
    *G06F 40/166*    (2020.01)

(56) References Cited

OTHER PUBLICATIONS

Gong et al., "Automatic Generation of Chinese Short Product Titles for Mobile Display", 2019, p. 1-7.
Chen et al., "Towards Knowledge-Based Personalized Product Description Generation in E-commerce", 2019, p. 1-11.
Joshi, "Transfer Learning for NLP: Fine-Tuning BERT for Text Classification", 2020, p. 1-32.

* cited by examiner

| PEDIGREE | Dry | Dog | Food | Roasted | Chicken | And | Vegetable | Flavor |
|---|---|---|---|---|---|---|---|---|
| B | O | O | O | O | O | O | O | O |

| duck | , | fillet | mignon | and | ranch | raised | lamb | flavor |
|---|---|---|---|---|---|---|---|---|
| B | O | B | E | O | B | I | E | O |

METHODS AND APPARATUS TO GENERATE TEXTUAL DATA USING MACHINE LEARNING PROCESSES

TECHNICAL FIELD

The disclosure relates generally to machine learning processes and, more specifically, to machine learning processes in e-commerce systems.

BACKGROUND

At least some websites, such as retailer websites, allow customers to purchase items, such as products and services. Customers may access the websites using a web browser that executes on a computing device and connects to the Internet. The websites may allow the customer to browse items, and purchase items by adding them to an online shopping cart. For example, the websites allow the customer to provide search terms through a search box. In response to the receiving the search terms, the websites match the search terms to items, and displays the items to the customer. For example, the website may display item titles to the customers.

In some examples, computing devices, such as smartphones, allow the customer to audibly provide input (e.g., voice commands), converts the audibly provided input to textual data, and provides the textual data to the websites. For example, a smartphone may have speech recognition capability that generates textual information from human speech. The customer may speak a request to the smartphone, such as a command to search for items. The smartphone may generate textual information identifying the request, and provide the textual information to a website. The website may generate a response based on the received textual information. The response may identify items, such as within search results when receiving a search request. The response may include textual information, such as item titles. The website may then provide the textual information to the computing device. The computing device may convert the received textual information to audio, and may play the audio to the customer.

Often times, however, the textual information provided by the website identifies items in a complex or confusing manner. For example, the textual information may not be structured in a user-friendly manner. As a result, the customer may not be satisfied with the shopping experience. As such, there are opportunities to improve e-commerce systems.

SUMMARY

The embodiments described herein are directed to automatically generating more succinct and user-friendly item information, such as item descriptions, and providing the item information to customers. For example, the embodiments may generate and provide personalized item descriptions to customers during conversational interactions in speech-based systems. In some examples, the embodiments extract entities (e.g., attributes) from item information, and apply trained machine learning processes to the extracted entities to generate textual data that can be converted to audio and played to customers. The generated textual data may include item descriptions more suitable during conversations in e-commerce systems. In some examples, the embodiments operate on input data including item titles, quantity information, packaging type, and other attributes (e.g., modifiers) to generate a personalized item description for one or more items. For example, assuming an item title of "Brand Green Dill Pickle Halves, 32.0 FL OZ a jar claussen kosher dill," the embodiments may generate an output of "a 32 ounce jar of Brand Green dill pickle halves."

As a result, the embodiments may allow a retailer to present more user-friendly item information to customers, such as item descriptions of search results. For example, the embodiments may allow customers to more easily engage in conversations with websites. The embodiments help preserve information that is useful to customers, such as by avoiding the paraphrasing of key terms. The embodiments may also generate personalized item descriptions based on user preferences. Retailers may benefit by more easily generating item descriptions that are more user-friendly, thereby saving resources and increasing sales. Persons of ordinary skill in the art having the benefit of these disclosures may recognize these and other benefits of the embodiments as well.

In accordance with various embodiments, exemplary systems may be implemented in any suitable hardware or hardware and software, such as in any suitable computing device. For example, in some embodiments, a computing device receives item information for an item, and extracts entities from the item information. For example, the computing device may extract one or more of a brand, a quantity, an item description, a package description, a unit (e.g., Ounces, FL Oz, lb, etc.), and a value (e.g., 32, 1, 16, dozen, etc.) from the item information. Further, the computing device may label each of the extracted entities. The computing device may then apply a trained machine learning process to the labelled extracted entities to generate item descriptions. For example, the computing device may apply a trained natural language processing (NLP model, such as a trained transformer-based machine learning technique (e.g., Bidirectional Encoder Representations from Transformers (BERT)), to the labelled extracted entities. In some examples, the computing device applies post processing techniques to the generated item descriptions. For example, the computing device may remove duplicate unigrams and bigrams, and may perform quality checks.

In some embodiments, a computing device is configured to receive an item description request, and to generate word embeddings based on the item request. The computing device is also configured to apply a neural network to the word embeddings to identify entities. Further, the computing device is configured to apply a trained natural language processing model to the entities and word embeddings to generate an item description. The computing device is also configured to transmit the item description in response to the item description request.

In some embodiments, a computing device obtains an item title for a plurality of items. Further, the computing device generates word embeddings for the plurality of items based on the item titles, and applies a neural network to the word embeddings to generate entities. The computing device is also configured to train a natural language processing model with the entities and the word embeddings. Further, the computing device is configured to store the trained natural language processing model in a data repository.

In some embodiments, a method is provided that includes receiving an item description request, and generating word embeddings based on the item request. The method also includes applying a neural network to the word embeddings to identify entities. Further, the method includes applying a trained natural language processing model to the entities and word embeddings to generate an item description. The method also includes transmitting the item description in response to the item description request.

In some embodiments, a method is provided that includes obtaining an item title for a plurality of items. Further, the method includes generating word embeddings for the plurality of items based on the item titles, and applying a neural network to the word embeddings to generate entities. The method also includes training a natural language processing model with the entities and word embeddings. Further, the method includes storing the trained natural language processing model in a data repository.

In yet other embodiments, a non-transitory computer readable medium has instructions stored thereon, where the instructions, when executed by at least one processor, cause a computing device to perform operations that include receiving an item description request, and generating word embeddings based on the item request. The operations also include applying a neural network to the word embeddings to generate entities. Further, the operations include applying a trained natural language processing model to the entities and word embeddings to generate an item description. The operations also include transmitting the item description in response to the item description request.

In yet other embodiments, a non-transitory computer readable medium has instructions stored thereon, where the instructions, when executed by at least one processor, cause a computing device to perform operations that include obtaining an item title for a plurality of items. Further, the operations include generating word embeddings for the plurality of items based on the item titles, and applying a neural network to the word embeddings to generate entities. The operations also include training a natural language processing model with the entities and word embeddings. Further, the operations include storing the trained natural language processing model in a data repository.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 5B is a diagram of tagged terms using the entity tagging model of FIG. 5A, in accordance with some embodiments

DETAILED DESCRIPTION

Figure 1:
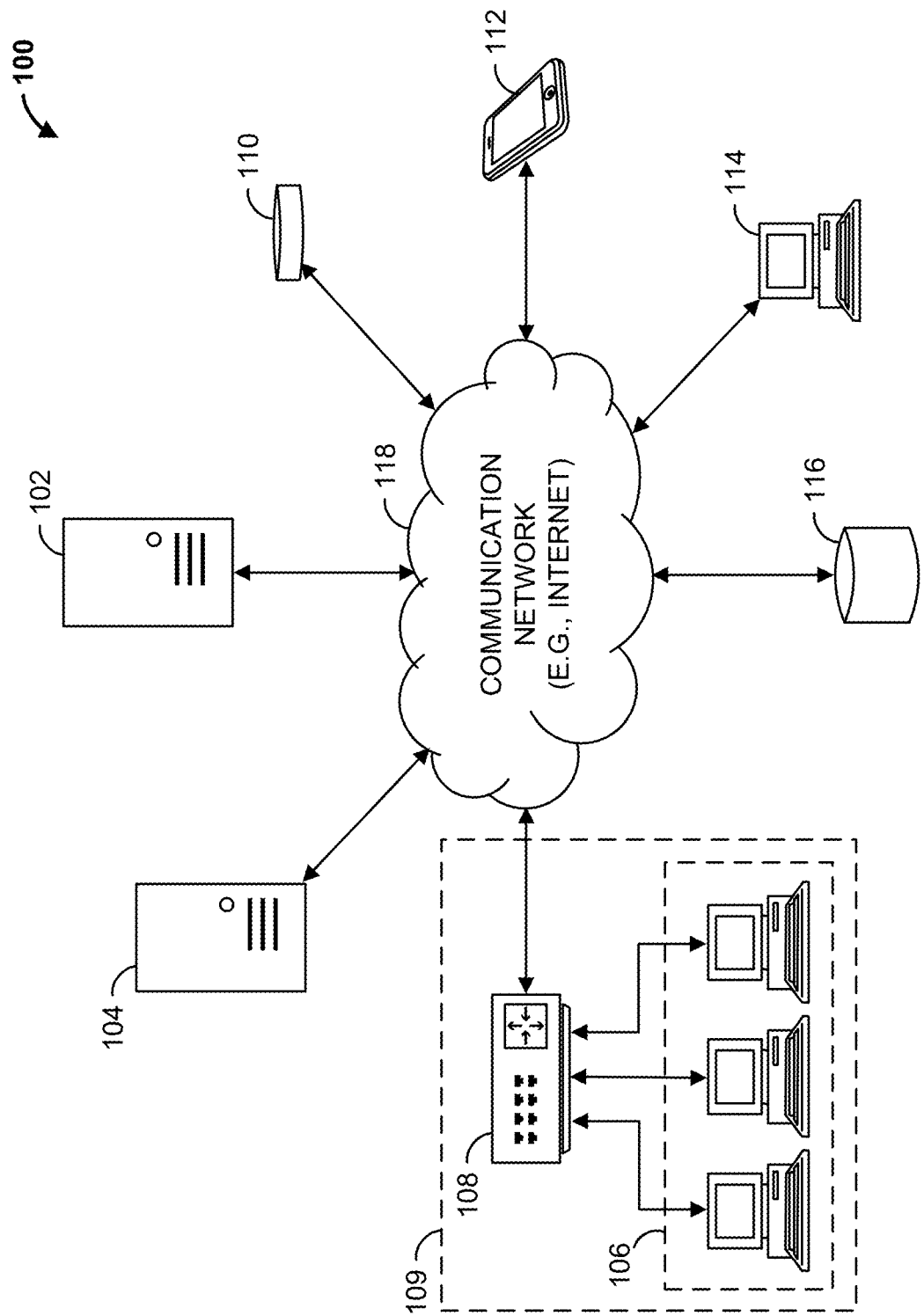
FIG. 1 is a block diagram of an e-commerce system, in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an e-commerce system 100 that includes an NLP computing device 102 (e.g., a server, such as an application server), a web server 104, workstation(s) 106, a database 116, and multiple customer computing devices 110, 112, 114, each operatively coupled over network 118.

NLP computing device 102, workstation(s) 106, web server 104, and multiple customer computing devices 110, 112, 114 can each be any suitable computing device that includes any hardware or hardware and software combination for processing data. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, NLP computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, NLP computing device 102, item recommendation system 105, and web server 104 are operated by a retailer, and multiple customer computing devices 112, 114 are operated by customers of the retailer.

Although FIG. 1 illustrates three customer computing devices 110, 112, 114, e-commerce system 100 can include any number of customer computing devices 110, 112, 114. Similarly, e-commerce system 100 can include any number of workstation(s) 106, NLP computing devices 102, web servers 104, and databases 116.

Workstation(s) 106 is operably coupled to communication network 118 via router (or switch) 108. Workstation(s) 106 and/or router 108 may be located at a store 109, for example. Workstation(s) 106 can communicate with NLP computing device 102 over communication network 118. The workstation(s) 106 may send data to, and receive data from, NLP computing device 102. For example, the workstation(s) 106 may transmit purchase data related to orders purchased by customers at store 109 to NLP computing device 102. The purchase data may include, for example, one or more of a price, identification number (e.g., Universal Product Number), quantity, brand, size, and option of each item purchased.

In some examples, a customer may scan one or more items at store 109 to purchase the item. For example, a customer computing device 110, 112, 114 may execute an application that allows the customer to scan an item at store 109, such as by scanning a Quick Response (QR) code or Universal Product Code (UPC) number of the item. The customer computing device 110, 112, 114 may transmit an identification of the scanned item to NLP computing device 102 based on the scanned information. In response to receiving the identification, NLP computing device 102 may generate an item description for the item, and may transmit the item description to the customer computing device 110, 112, 114. Customer computing device 110, 112, 114 may, upon receiving the item description, display the item description to the customer.

In some examples, web server 104 hosts one or more websites, such as a retailer's website. Customers, via one or more customer computing devices 110, 112, 114, may access the website, which may allow customers to purchase items. For example, the website may advertise items for sale. The website may allow customers to add items to an online shopping cart, and purchase the items within the online shopping cart. The website may further allow the customer to provide a search query, such as within a search bar, to search for items. In some examples, the customer's computing device 110, 112, 114 includes speech recognition capability, and generates textual information based on audio captured from the customer's speech. For example, the customer may speak a command to add an item to the online shopping cart (e.g., "add brand bee chicken to cart"), or may request availability of an item or type of item (e.g., "boneless chicken breast tenderloins"). The customer's computing device 110, 112, 114 may package the textual information into an inquiry message (e.g., search query), and may transmit the inquiry message to web server 104.

In some examples, web server 104 captures and stores customer data, such as customer session data and/or customer purchase data, within database 116. Customer session data may identify, for example, item engagements (e.g., item and advertisement clicks, item and advertisement impressions, add-to-cart (ATC) events, etc.), and search queries, for a customer (e.g., caused by the customer's engagement with the website). Customer purchase data may identify, for example, items purchased, include information about each item purchased (e.g., price, quantity, brand, size, options, description, etc.).

Web server 104 may determine one or more items to display (e.g., advertise) to the customer based on the received inquiry message. For example, web server 104 may determine one or more search results for the customer in response to a search query. Web server 104 may determine one or more items to advertise to the customer (e.g., search results) based on the customer data. Further, web server 104 may request from NLP computing device 102 an item description for each item in the search results. For example, web server 104 may generate and transmit an item description request for the items to NLP computing device 102. NLP computing device 102 may generate an item description as described herein for each item, and may transmit the item descriptions to web server 104. Web server 104 may include the item descriptions within a response message to the customer's computing device 110, 112, 114.

NLP computing device 102 is operable to communicate with database 116 over communication network 118. For example, NLP computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to NLP computing device 102, in some examples, database 116 can be a local storage device, such as a hard drive, a non-volatile memory, or a USB stick. Database 116 may store, for example, customer purchase data and/or customer session data. Database 116 may also store catalog data, which may identify one or more features of each of a plurality of items, such as items sold at store 109 and/or a website hosted by web server 104.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, NLP computing device 102 receives an item description request from web server 104. The item description request 104 may identify one or more items (e.g., via an item ID). For each identified item, NLP computing device 102 may obtain an item title from database 116. As an example, an item title may include the following terms: "Brand X cat litter deodorizer with baking soda, 20.0 Oz." NLP computing device 102 may generate word embeddings based on the obtained item title. For example, NLP computing device 102 may generate a word embedding for each word of the above quoted item title.

In some examples, web server 104 provides an inquiry within the item description request. For example, the item description request may include textual information from an inquiry (e.g., search request) web server 104 received from the customer computing device 110, 112, 114. The inquiry may include text data identifying a plurality of characters. In this example, NLP computing device 102 may generate word embeddings for each word of the inquiry.

NLP computing device 102 may further apply a neural network, such as a bi-directional long short term memory (LSTM) neural network, to the generated word embeddings to generate one or more context vectors. In some examples, a context vector is generated for each word. Further, NLP computing device 102 may provide the generated context vector as input to an attention model, and the attention model operates on the context vector to generate to attention values. The attention model operates to determine an importance of each word in the input context vector, and generates the attention values based on the determinations. NLP computing device 102 may then apply a conditional random field (CRF) model to the attention values to determine a sequence tag for each term (e.g., one or more words) of the context vector. The CRF model may identify, for example, whether each term is a "beginning," "inside," "outside," or and "end" of an attribute.

NLP computing device 102 further determines an entity for the one or more terms. For example, NLP computing device 102 may determine whether a term is a brand, a quantity, or a unit, for example. The type of entity (e.g., attribute) may be determined based on catalog data. In continuing the example from above, NLP computing device 102 may determine that "Brand X" is a brand, "Oz" is a unit, and "20.0" is a quantity. NLP computing device 102 may generate a label (e.g., token) for each determined attribute (e.g., based on the sequence tags), and may generate a labelled context vector in which attributes are replaced by the generated label. For example, in continuing the above example, NLP computing device may generate a labelled context vector such as " "<\brand> cat litter deodorizer with baking soda, <\quantity> <\unit>." In this example, "Brand X" is replaced with the label "<\brand>," "20.0" is replaced with the label "<\quantity>," and "Oz" is replaced with the label "<\unit>." NLP computing device 102 may then train a natural language processing model, such as a bi-BERT model, with the labelled context vectors.

NLP computing device 102 may apply the trained natural language processing model to labelled context vectors to generate a user friendly item description. For example, based on application of the trained natural language processing model to the example labelled context vector from above, NLP computing device 102 may generate an output such as "a "<\quantity> <\unit> box of <\brand> cat litter deodorizer." Further, NLP computing device 102 may (e.g., during post processing) replace the labels with the corresponding text to generate an item description. For example, NLP computing device 102 may replace the labels in the exemplary output of the trained natural language processing model to generate an item description of "a 20.0 ounce box of Brand X cat litter deodorizer."

In some examples, NLP computing device 102 may process the item description to remove duplicate unigrams and bigrams. For example, NLP computing device 102 may remove one of the terms "chocolate" in a trained natural language processing model output of "a pack of 20 Brand Y chocolate chocolate milk" to generate "a pack of 20 Brand Y chocolate milk." Similarly, NLP computing device 102 may remove one of the bigrams of "red onions" in a trained natural language processing model output of "an 8 pound pack of red onions red onions" to generate "an 8 pound pack of red onions."

NLP computing device 102 may then transmit the item description to web server 104 in response to the item description request. Web server 104 may transmit the item description to the customer computing device 110, 112, 114, and customer computing device 110, 112, 114 may convert the item description to speech, and play the speech to the customer. In some examples, customer computing device 110, 112, 114 displays the item description to the customer.

In some examples, NLP computing device 102 trains the natural language processing model based on item titles. The item titles may include, for example, quantities (e.g., dozen, one, 3, etc.), units, packing type (e.g., jars, jugs, cartons, box, can, packets, etc.), brands, and any other suitable item description. In some examples, the natural language processing model is a BERT model. The BERT model may be an unsupervised model that is trained in two steps. In a first step, a corpus of items titles are used to train the model, where a percentage (e.g., 15%) of tokens in the item titles are masked to predict the masked word. Any suitable corpus can be used. In some examples, a BERT model is pre-trained on a giant corpus of English text and is then trained with item descriptions as per the above described process. In a second step, the BERT model is provided with two sentences (e.g., two sentences of an item title), where a token is masked in each sentence. The BERT model is trained to predict which sentence should come first.

In some examples, the encoder and decoder of the BERT model are trained at different rates. For example, item titles may contain just one sentence. NLP computing device 102 generates token embeddings, sentence embeddings, and position embeddings based on the item titles. For example, a sequence length of 128 may be used, where for each element in the sequence there is a token, a sentence embedding, and a position embedding. The sentence embedding may be the same for each position embedding. As such, the BERT model may be trained based on a corpus (e.g., of item titles) according to the following:

$$x_i = E_{token} + E_{Seg} + E_{pos} \quad \text{(eq. 1)}$$

where:
$x_i$ is the input representation;
$E_{token}$ is token embedding;
$E_{Seg}$ is sentence embedding; and
$E_{pos}$ is position embedding.

For example, NLP computing device 102 may generate input representations ($x_i$) based on item titles for a plurality of items, where the input representations include token embeddings ($E_{token}$), sentence embeddings ($E_{Seg}$), and position embeddings ($E_{pos}$). In addition, NLP computing device 102 may apply differing learning rates to the encoder and decoder of the BERT model. For example, NLP computing device 102 may apply the following learning rates to the encoder and decoder.

$$\text{learning rate}_{encoder} = 2e^{-3} \cdot \min(\text{step}^{-0.5}, \text{step} \times 20000^{-1.5}) \quad \text{(eq.2)}$$

$$\text{learningrate}_{decoder} = 0.2 \cdot \min(\text{step}^{-0.5}, \text{step} \times 10000^{-1.5}) \quad \text{(eq.3)}$$

NLP computing device 102 may apply these learning rates (e.g., gains) to determine the step size at each iteration while moving toward a minimum of a loss function. In some examples, NLP computing device 102 determines a loss as the natural language processing model is trained, and continues to train the natural language processing model until the loss reaches a threshold. NLP computing device 102 may determine the loss based on a loss algorithm (e.g., loss function), such as a softmax algorithm, for example. NLP computing device 102 may store the trained natural language processing model in database 116.

Figure 2:
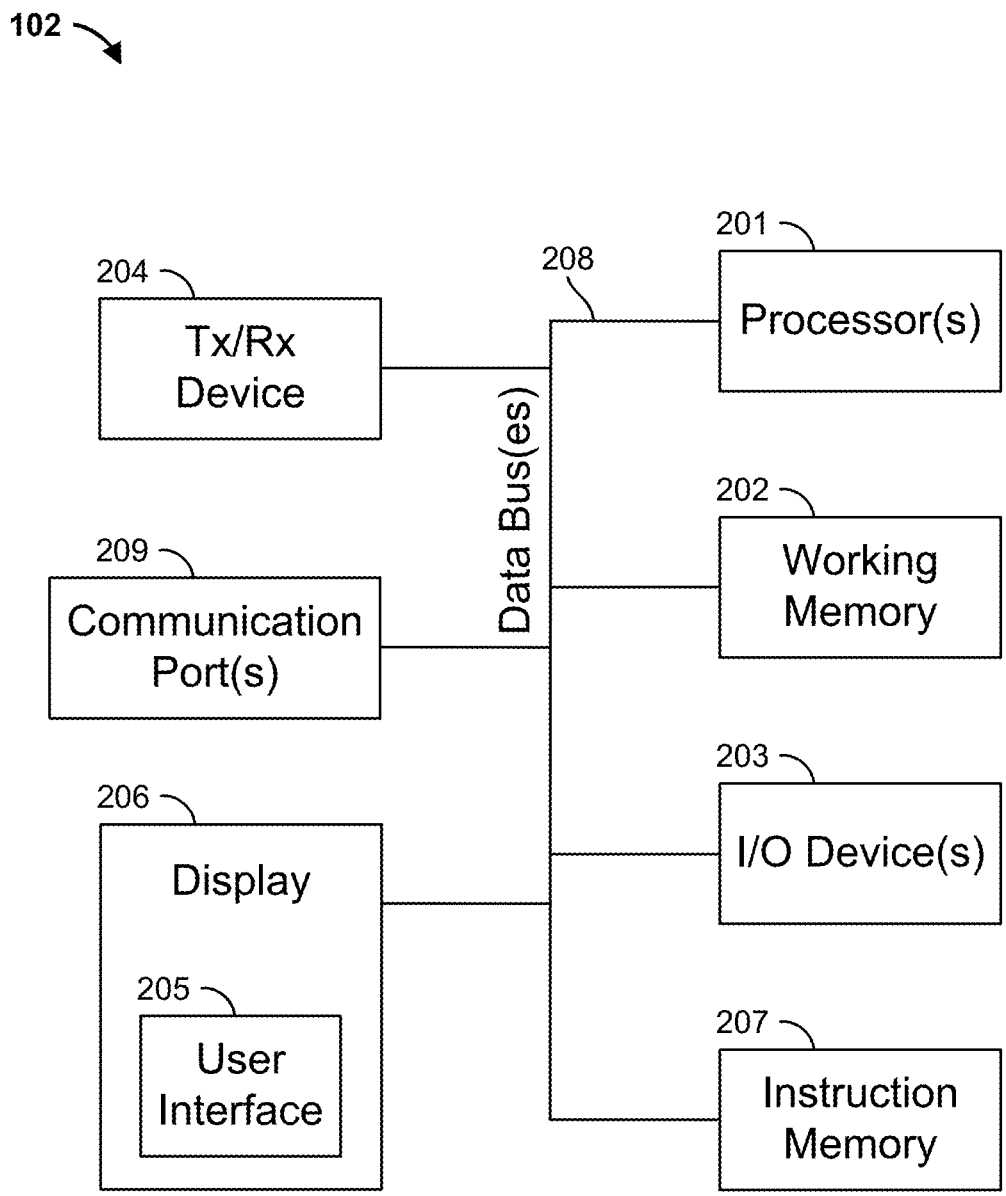
FIG. 2 is a block diagram of the natural language processing (NLP) computing device of the e-commerce system of FIG. 1, in accordance with some embodiments.

FIG. 2 illustrates the NLP computing device 102 of FIG. 1. NLP computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of NLP computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allows for the transfer (e.g., uploading or downloading) of data, such as the uploading of executable instructions to be executed by processor 201 and stored in instruction memory 207.

Display 206 can display user interface 205. User interfaces 205 can enable user interaction with NLP computing device 102. For example, user interface 205 can be a user interface for an application of a retailer that allows the retailer to select machine learning models to be applied to user session data received from web server 104, such as user session data received for customers accessing a retailer's website hosted by web server 104. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 NLP computing device 102 will be operating in. Processor(s) 201 is operable to receive data from, or send data to, a network, such as communication network 118 of FIG. 1, via transceiver 204.

Figure 3:
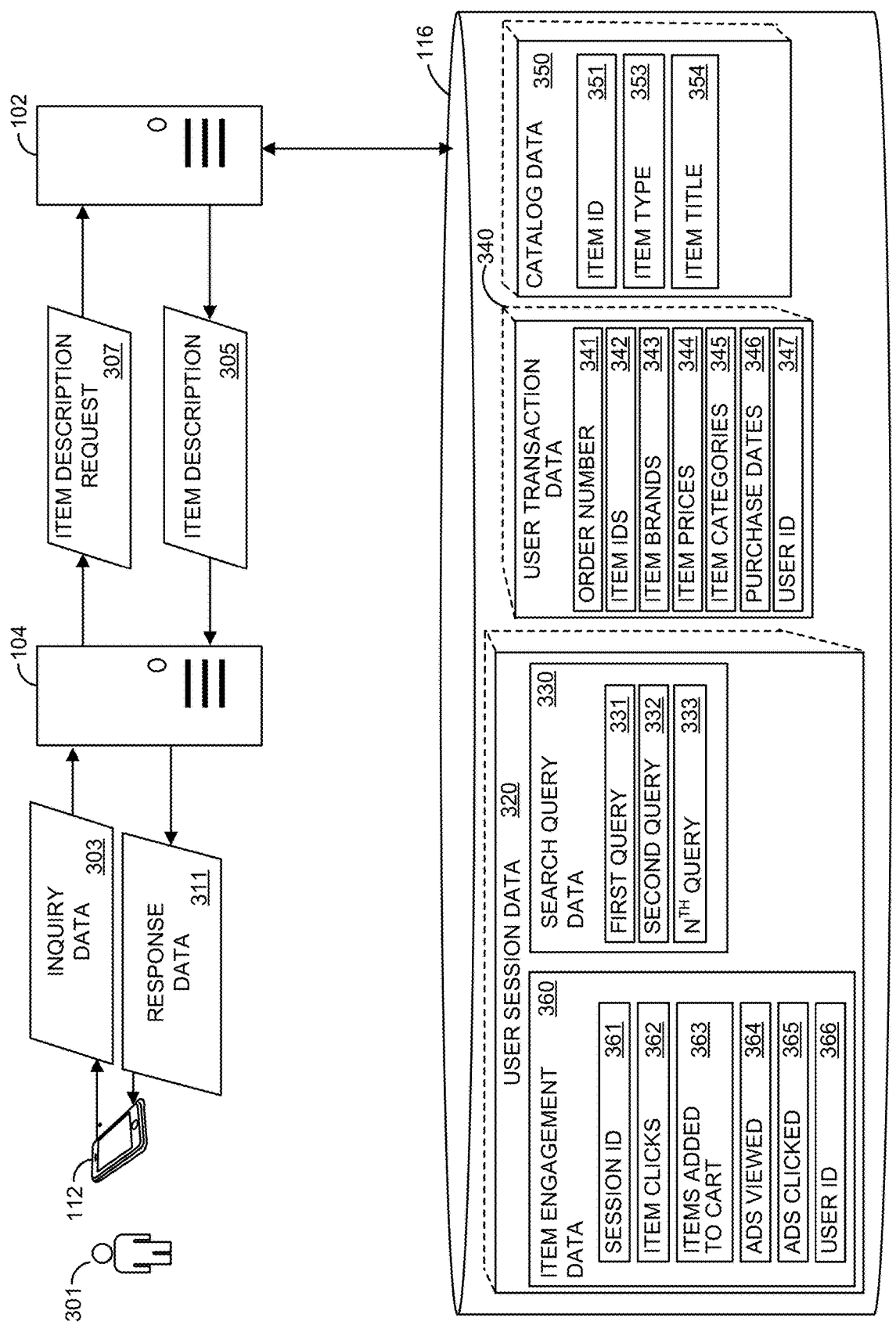
FIG. 3 is a block diagram illustrating examples of various portions of the e-commerce system of FIG. 1, in accordance with some embodiments.

FIG. 3 illustrates various portions of the e-commerce system 100 of FIG. 1. In this example, web server 104 hosts a website, such as a retailer's website, that customers, such as customer 301, may access via computing devices, such as customer computing device 112. Web server 104 may identify user session data 320 and user transaction data 340 for each customer 301 that access the website, and may store user session data 320 and user transaction data 340 within database 116.

User session data 320 may include, for example, item engagement data 360 and search query data 330. Item engagement data 360 may include one or more of a session ID 361 (i.e., a website browsing session identifier), item clicks 362 identifying items which the user clicked (e.g., images of items for purchase, keywords to filter reviews for an item), items added-to-cart 363 identifying items added to the user's online shopping cart, advertisements viewed 364 identifying advertisements the user viewed during the browsing session, advertisements clicked 365 identifying advertisements the user clicked on, and user ID 366 (e.g., a customer ID, retailer website login ID, etc.). Search query data 330 identifies one or more searches conducted by a user during a browsing session (e.g., a current browsing session). In this example, search query data 330 includes first query 331, second query 332, and $N^{th}$ query 333.

User transaction data 340 may include, for each purchase, one or more of an order number 341 identifying a purchase order, item IDs 342 identifying one or more items purchased in the purchase order, item brands 343 identifying a brand for each item purchased, item prices 344 identifying the price of each item purchased, item category 345 identifying a category of each item purchased, a purchase date 346 identifying the purchase date of the purchase order, and user ID 347 for the user making the corresponding purchase (which, in some examples, may be the same as user ID 366 for a same customer).

Database 116 may further store catalog data 350, which may identify one or more of a plurality of items, such as items a retailer may sell at store 109 or on a website hosted by web server 104. Catalog data 350 may include, for each of the plurality of items, an item ID 351 (e.g., an SKU number), an item type 353 (e.g., a grocery item such as milk, clothing item), and an item title 354 (e.g., a description of the item as provided by a manufacturer, or configured by a user). Catalog data 350 may include additional information, such as an item description (e.g., as provided by a manufacture of the item), item packaging type, item brand, item options, or any other information related to an item.

As indicated in the figure, customer 301 may operate customer computing device 112 to access the website hosted by web server 104. The customer 301 may provide input to customer computing device 112, which is converted to inquiry data 303 and transmitted to web server 104. Inquiry data 303 may identify a string of characters, which may represent a search query, or a command, for example. For example, inquiry data 303 may identify text entered within a search bar of the website, for example.

Based on inquiry data 303, web server 104 may identify one or more items. For example, assuming inquiry data 303 identifies a search query (e.g., one or more search terms entered within a search bar of the website), web server 104 may determine one or more items based on the search query. Web server 105 may generate an item description request 307 identifying the one or more items, and transmit the item description request 307 to NLP computing device 102. For example, web server 104 may identify each item using a corresponding item identifier, such as an item ID 351. NLP computing device 102 may receive item description request 307, and obtain a corresponding item title 354 from database 116 for each corresponding item. For example, NLP computing device 102 may determine the item title 354 for the item based on determining a corresponding item ID 351 for the item (e.g., by comparing a received item ID to item IDs 351).

Further, NLP computing device 102 may determine entities based on the obtained item title 354. For example, NLP computing device 102 may generate word embeddings for each word of the inquiry, and may further apply a neural network, such as a bi-directional long short term memory (LSTM) neural network, to the generated word embeddings to generate a context vector. Further, NLP computing device 102 may apply an attention model to the context vector to generate attention values. NLP computing device 102 may then apply a CRF model to the attention values to generate a sequence tag for each term of the context vector.

NLP computing device 102 further determines entities based on the terms and corresponding attribute types. For example, NLP computing device 102 may determine whether a term is a brand, a quantity, a unit, or a quantity. NLP computing device 102 may generate a label (e.g., token) for each term, and may generate a labelled context vector in which attributes are replaced by the generated label.

NLP computing device 102 may then apply a trained natural language processing model, such as a bi-BERT model, to the labelled context vector to generate a user friendly item description. In some examples, NLP computing device 102 may process the item description to remove duplicate unigrams and bigrams. NLP computing device 102 transmits the item description 305 to web server 104 in response to the item description request 303.

In some examples, the customer 301 may speak a command into customer computing device 112, such as "what chicken breast is available," or "add brand bee apples to cart." Customer computing device 112 may convert the speech to text data, and provide the text data within inquiry data 303 to web server 104. Web server 104 may package the text data within item description request 307, and transmit item description request 307 to NLP computing device 102.

NLP computing device 102 may receive item description request 307, and may determine entities based on the text data received within item description request 307. For example, NLP computing device 102 may generate word embeddings based on the text data, and may further apply a neural network, such as a bi-directional long short term memory (LSTM) neural network, to the generated word embeddings to generate a context vector. Further, NLP computing device 102 may apply an attention model to the context vector to generate an output context vector. NLP computing device 102 may then apply a CRF model to the output context vector to tag attributes of the output context vector.

NLP computing device 102 further determines entities based on the terms and corresponding attribute types. For example, NLP computing device 102 may determine whether a term is a brand, a quantity, a unit, or a quantity. NLP computing device 102 may generate a label (e.g., token) for each tagged attribute, and may generate a labelled context vector in which the attributes are replaced by the generated label.

NLP computing device 102 may then apply a trained natural language processing model, such as a bi-BERT model, to the labelled context vector to generate a user friendly item description. In some examples, NLP computing device 102 may process the item description to remove duplicate unigrams and bigrams. NLP computing device 102 transmits the item description 305 to web server 104 in response to the item description request 303.

Figure 4:
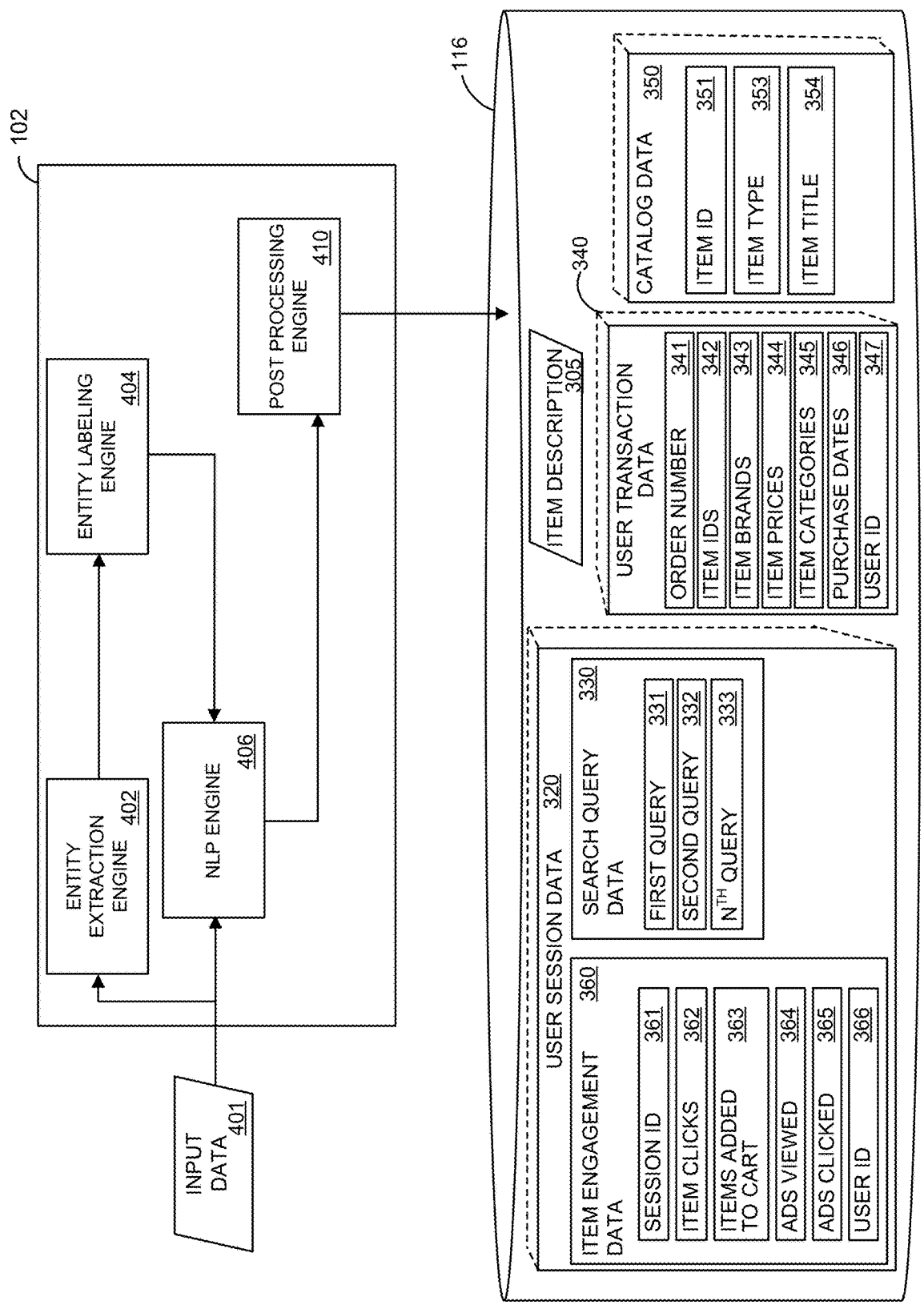
FIG. 4 is a block diagram illustrating examples of various portions of the e-commerce system of FIG. 1, in accordance with some embodiments.

FIG. 4 illustrates various portions of the e-commerce system 100 of FIG. 1. As illustrated, NLP computing device 102 includes entity extraction engine 402, entity labeling engine 404, NLP engine 406, and post processing engine 410. In some examples, one or more of entity extraction engine 402, entity labeling engine 404, NLP engine 406, and post processing engine 410 may be implemented in hardware. In some examples, one or more of entity extraction engine 402, entity labeling engine 404, NLP engine 406, and post processing engine 410 may be implemented as an executable program maintained in a tangible, non-transitory memory, such as instruction memory 207 of FIG. 2, and that may be executed by one or processors, such as processor 201 of FIG. 2.

NLP computing device 102 receives input data 401 from, for example, a web server, such as web server 104. Input data 401 may include text data, such as a string of characters defining one or more terms. Entity extraction engine 402 receives input data 401, identifies particular entities within input data 401, and generates tokens for the identified entities. To identify the entities, entity extraction engine 402 may generate word embeddings based on the input data 401. Further, entity extraction engine 402 may apply a neural network, such as a bi-directional long short term memory (LSTM) neural network, to the generated word embeddings, to generate a context vector. Further, entity extraction engine 402 may apply an attention model to the generated context vector to generate attention values. Entity extraction engine 402 may then apply a CRF model to the attention values to determine sequence tags (e.g., sequence tagging) for one or more attributes of the context vector. The CRF model may identify, for example, whether each term is a "beginning," "inside," "outside," or and "end" of an attribute.

Entity extraction engine 402 provides the output context vector, the attributes, and sequence tags to entity labeling engine 404. Entity labeling engine 404 determines an entity for the attributes based on the sequence tags. For example, entity extraction engine 404 may determine whether a term is a brand, a quantity, a unit, or a quantity. Entity extraction engine 404 generates a token for each entity, and replaces the corresponding terms in the output context vector with the token. For example, entity labeling engine 404 may replace all brand entities with the token "<\brand>," all quantity entities with "<quantity>," all unit entities with "<unit>," and all package descriptor entities with "<package>." Entity labeling engine 404 provides the updated output context vector to NLP engine 406.

NLP engine 406 applies a trained NLP model, such a trained BERT model, to the updated context vector received from entity labeling engine 404 and to embeddings generated from input data 401. For example, NLP engine 406 may generate a token embedding and a position embedding from input data 401, and generate a sentence embedding based on the updated context vector. NLP engine 406 may apply the trained NLP model to the token, sentence, and position embeddings to generate an initial item description. The initial item description may include a rearrangement of terms, and the tokens generated by entity labeling engine 404. NLP engine 406 provides initial item description to post processing engine 410.

Post processing engine 410 receives the initial item description from NLP engine 406, and processes the initial item description to generate a final item description 105. For example, post processing engine 410 may replace tokens within the initial item description with the corresponding terms. For example, NLP engine 406 may replace the tokens with the corresponding terms entity extraction engine 402 extracted. Post processing engine 410 may perform other post processing tasks. For example, post processing engine 410 may remove duplicate unigrams and bigrams from the initial item description. Post processing engine 410 stores the finalized item description 105 in database 116.

Figure 5A:
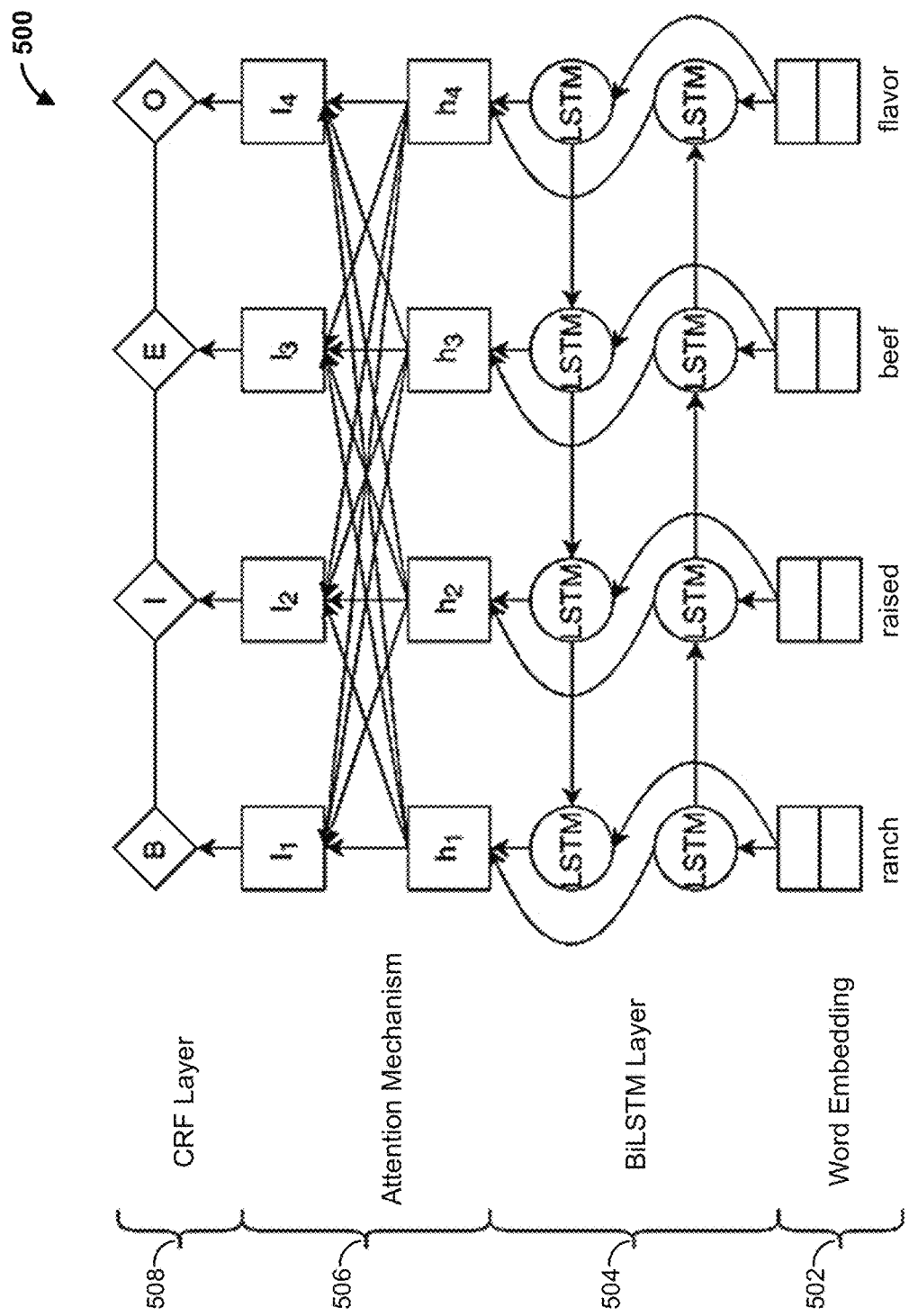
FIG. 5A is a diagram of an entity tagging model, in accordance with some embodiments.

FIG. 5A illustrates a diagram of an entity tagging model 500. Entity tagging model 500 may be implemented by, for example, entity extraction engine 402. Entity tagging model 500 includes word embeddings 502, a BiLSTM model 504, an attention model 506, and a CRF model 508. Word embeddings 502 may be generated based on the input data 401, for example.

The BiLSTM model 504 may operate on word embeddings 502 to generate a first context vector based on forward, and backward, context of the word embeddings 502. The attention model 506 operates on the first context vector and, based on an importance of each word, generates a second context vector that is provided to the CRF model 508. The CRF model 508 operates on the second context vector to determine a sequence tag for each term (e.g., one or more words) of the output context vector. The CRF model 508 may identify, for example, whether each term is a "beginning," (as identified by the "B" in the figure) "inside," (as identified by the "I" in the figure) "outside," (as identified by the "O" in the figure) or and "end" (as identified by the "E" in the figure) of an attribute.

FIG. 5B illustrates an exemplary attribute assignment 550 that may be an output of the CRF model 508. In this example, attribute assignment 550 includes first word embeddings 552 and corresponding first tag assignments 554, as well as second word embeddings 556 and corresponding second tag assignments 558. For example, first tag assignments 554 assign "beginning" (i.e., beginning of an attribute) as indicated by the letter "B" to the term "PEDIGREE" in first word embeddings 552. First tag assignments 554 also assign "outside" (i.e., outside of the attribute) as indicated by the letter "O" to the remaining terms in first word embeddings 552. Similarly, second tag assignments 558 assign "beginning" to the terms "duck," "fillet" and "ranch" in second word embeddings 556, and "outside" to the terms ",", "and," and "flavor" in second word embeddings 556. Second tag assignments 558 further assign "end" (i.e., end of an attribute) as indicated by the letter "E" to the terms "mignon" and "lamb" in second word embeddings 556, and "inside" (i.e., inside of an attribute) as indicated by the letter "I" to the term "raised" in second word embeddings 556.

Figure 6:
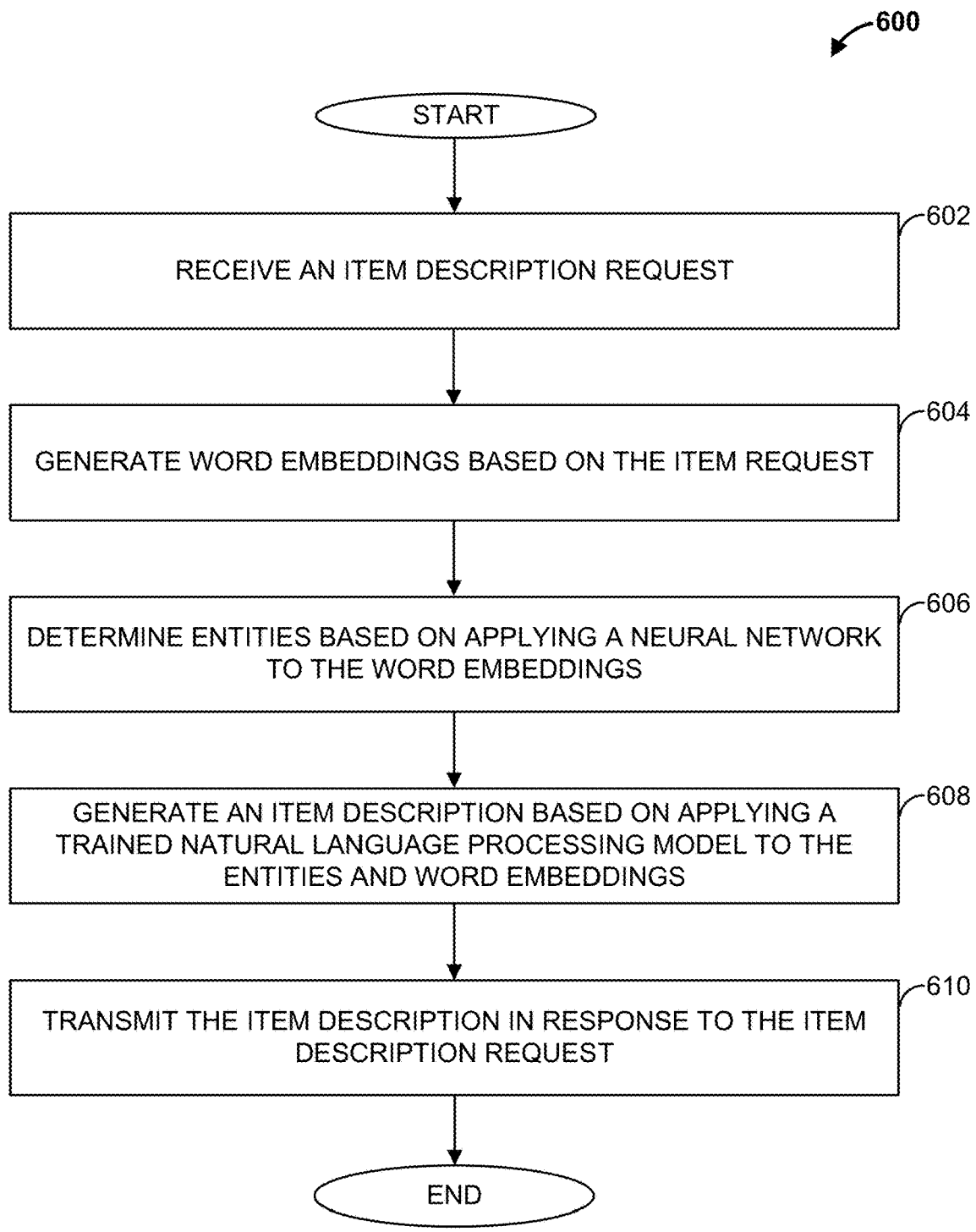
FIG. 6 is a flowchart of example method that can be carried out by the e-commerce system of FIG. 1, in accordance with some embodiments.

FIG. 6 is a flowchart of an example method 600 for generating item descriptions, and can be carried out by the e-commerce system 100 of FIG. 1. Beginning at step 602, an item description request is received. For example, NLP computing device 102 may receive an item description request 307 from web server 104. The item description request 307 may identify an item (e.g., via an item ID), or may include a search query or command, for example. At step 604, word embeddings are generated based on the item request. For example, NLP computing device 102 may obtain an item title 354 for an item identified by the item description request, and generate word embeddings based on the item title 354.

Proceeding to step 606, a neural network is applied to the word embeddings to determine entities. Entities may include, for example, brand, quantity, unit, or package descriptor entities. For example, NLP computing device 102 may apply a BiLSTM model to the word embeddings to determine the entities. At step 608, a trained NLP model is applied to the entities and word embeddings to generate an item description. For example, NLP computing device 102 may apply a trained BERT model to the entities and the word embeddings to generate the item description. At step 610, the item description is transmitted in response to the item description request. For example, NLP computing device 102 may transmit the item description to web server 104. In some examples, web server 104 displays the item description on a website. In some examples, web server 104 transmits the item description to a customer computing device 110, 112, 114, and the customer computing device 110, 112, 114 converts the item description to audio for playback. The method then ends.

Figure 7:
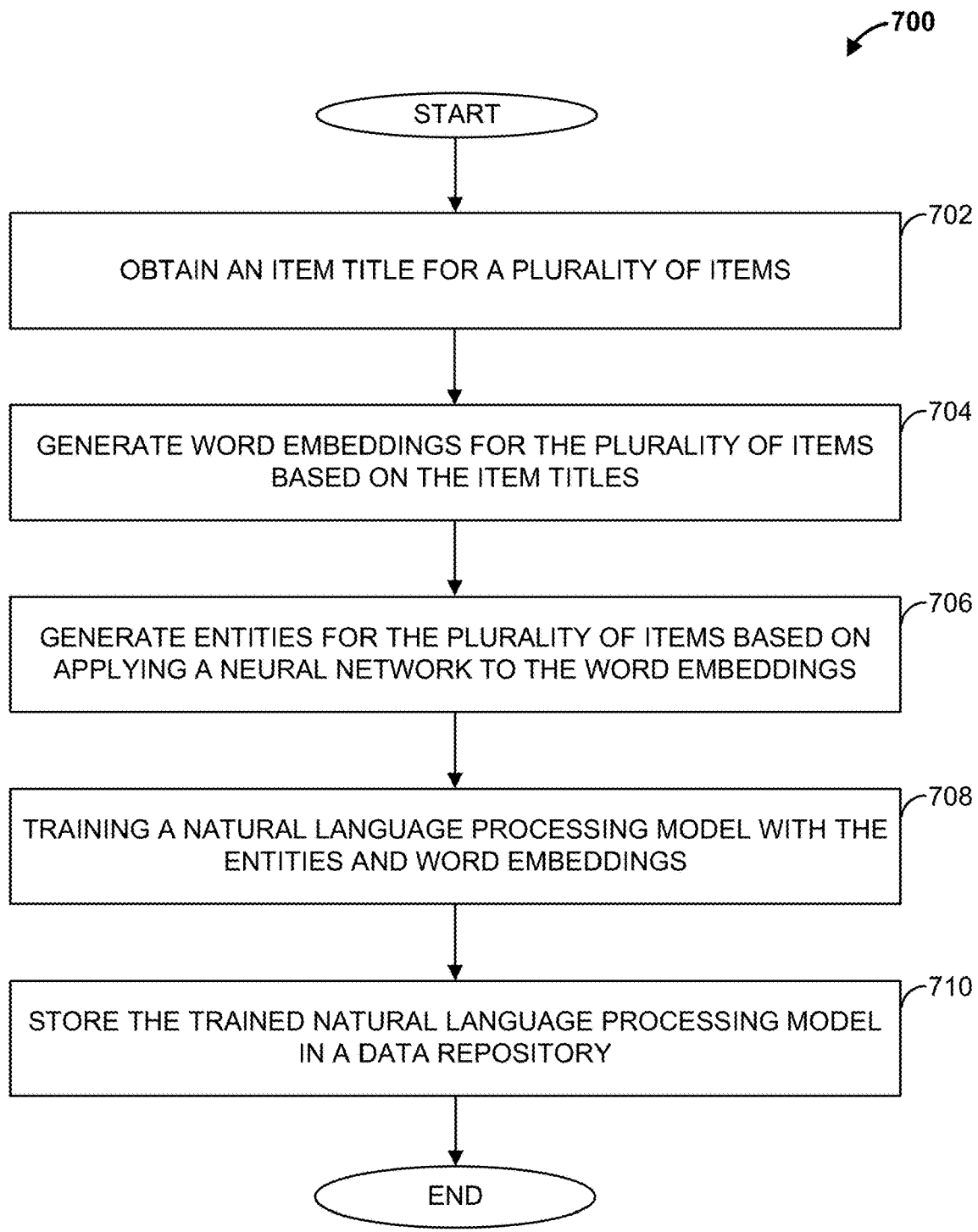
FIG. 7 is a flowchart of another example method that can be carried out by the e-commerce system of FIG. 1, in accordance with some embodiments.

FIG. 7 is a flowchart of an example method 700 for training an NLP model, and can be carried out by the e-commerce system 100 of FIG. 1. Beginning at step 702, an item title for each of a plurality of items is obtained. For example, NLP computing device 102 may receive an item description request from web server 104 identifying a plurality of items. NLP computing device 102 may obtain, for each item, an item title 354 from catalog data 350 stored in database 116. At step 704, word embeddings are generated for the plurality of items based on the item titles. For example, NLP computing device 102 may generate word embeddings for each of the plurality of items based on each item's corresponding item title 354.

Proceeding to step 706, a neural network is applied to the word embeddings to generate entities for each of the plurality of items. For example, NLP computing device 102 may apply a BiLSTM model to the word embeddings to determine the entities for each of the plurality of items. At step 708, an NLP model is trained with the entities and the word embeddings. In some examples, an encoder of the NLP model is trained with a different learning rate than a decoder of the NLP model is trained with. In some examples, the NLP model is a BERT model. At step 710, the trained NLP model is stored in a data repository. For example, NLP computing device 102 may store the trained NLP model in database 116. The method then ends.

Figure 8:
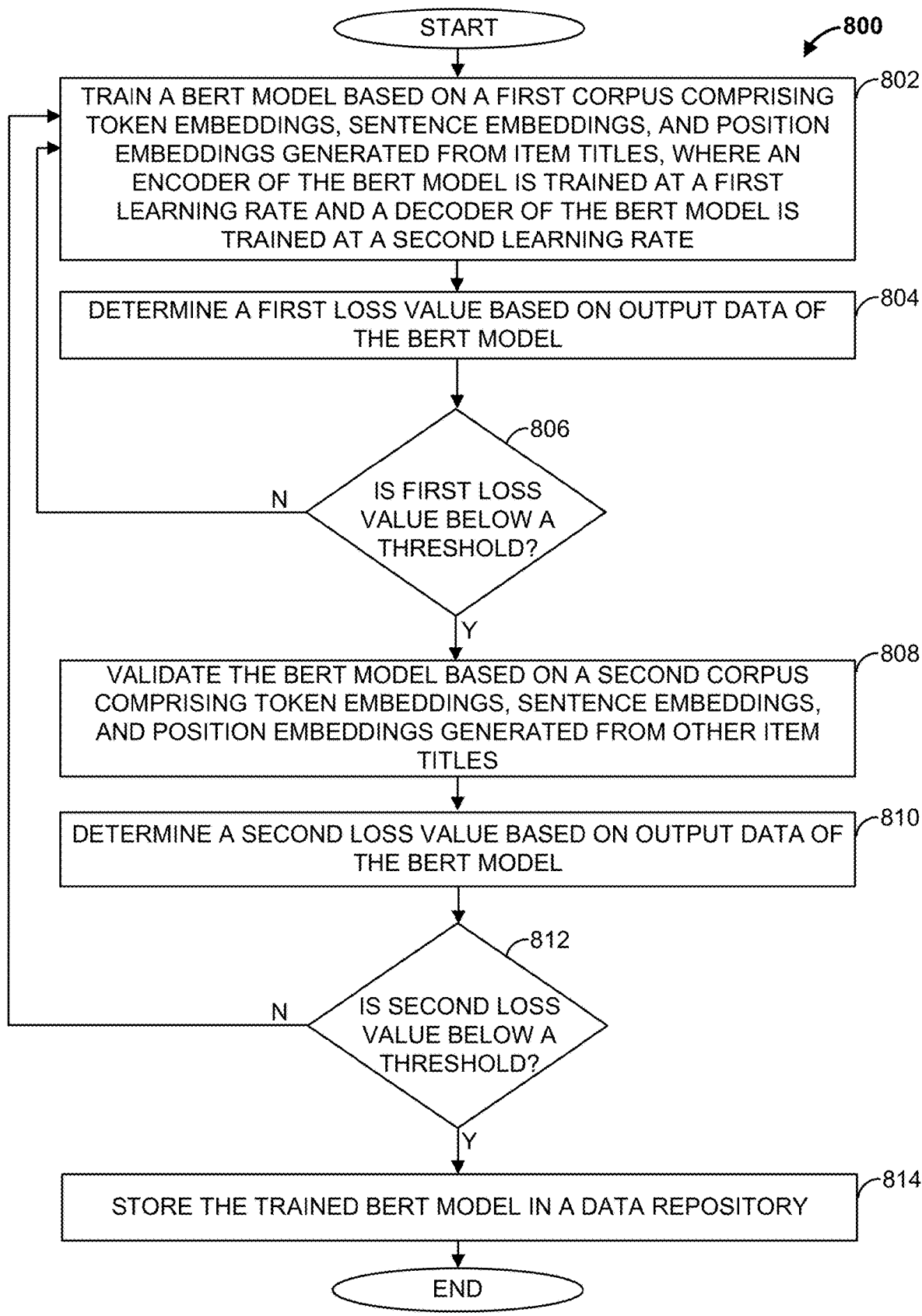
FIG. 8 is a flowchart of another example method that can be carried out by the e-commerce system of FIG. 1 in accordance with some embodiments.

FIG. 8 is a flowchart of an example method 800 for training an NLP model, and can be carried out by the e-commerce system 100 of FIG. 1. Beginning at step 802, a BERT model is trained based on a first corpus. The first corpus includes token embeddings, sentence embeddings, and position embeddings generated from item titles. In addition, an encoder of the BERT model is trained with a first learning rate, and a decoder of the BERT model is trained with a second learning rate. The first learning rate may be different than the second learning rate. In some examples, NLP computing device generates the token embeddings, sentence embeddings, and position embeddings from item titles 354 for a plurality of items, and stored in database 116.

At step 804, a first loss value is determined based on output data of the BERT model. For example, the BERT model generates output data during training. NLP computing device 102 computes the first loss value based on the output data. For example, NLP computing device 102 may determine the first loss value based on a softmax function.

At step 806, a determination is made as to whether the first loss value is below a threshold. If the first loss value is not below the threshold, the method proceeds back to step 802 to continue training the BERT model. Otherwise, if the first loss value is below the threshold, the method proceeds to step 808. At step 808, the BERT model is validated based on a second corpus. The second corpus includes token embeddings, sentence embeddings, and position embeddings generated from other item titles. For example, the second corpus may be distinct from the first corpus, such that the BERT model was not trained with any of the second corpus.

Proceeding to step 810, a second loss value is determined based on output data of the BERT model. For example, NLP computing device 102 can compute the second loss value based on the output data generated by the BERT model during validation. For example, NLP computing device 102 may determine the second loss value based on a softmax function. At step 812, a determination is made as to whether the second loss value is below a threshold. If the second loss value is not below the threshold, the method proceeds back to step 802 to continue training the BERT model. Otherwise, if the second loss value is below the threshold, the method proceeds to step 814.

At step 814, the trained BERT model is stored in a data repository. For example, NLP computing device 102 may store the trained BERT model in database 116. The method then ends.

In some examples, a system comprising a computing device that is configured to receive an item description request, and generate word embeddings based on the item description request. The computing device is also configured to determine at least one entity based on application of a neural network to the word embeddings, and generate an item description based on applying a trained natural language processing model to at least a portion of the word embeddings and the at least one entity. Further, the computing device is configured to transmit the item description in response to the item description request.

In some examples, determining at least one entity comprises applying a bi-directional long short term memory neural network model to the word embeddings to generate a context vector, applying an attention model to the context vector to generate attention values; and applying a conditional random field model to the attention values to determine sequence tags for the word embeddings. In some examples, the computing device is configured to determine attributes within the context vector based on the sequence tags, and replace the attributes with tokens. In some examples, generating the item description comprises replacing the tokens with the corresponding attributes. In some examples, the trained natural language processing model is trained to keep the tokens.

In some examples, the computing device is configured to train the natural language processing model with a corpus comprising item titles for a plurality of items. In some examples, the computing device is configured to randomly mask a portion of the item titles to train the natural language processing model. In some examples, the computing device is configured to generate a sentence embedding, a token embedding, and a position embedding based on each of the item titles, and train the natural language processing model with the generated sentence embeddings, token embeddings, and position embeddings.

In some examples, the computing device is configured to obtain an item title from a data repository in response to the item description request, wherein the word embeddings are generated based on the item title.

In some examples, the item request comprises textual data converted from audio.

In some examples, a method comprising receiving an item description request, and generating word embeddings based on the item description request. The method may also include determining at least one entity based on application of a neural network to the word embeddings. Further, the method may include generating an item description based on applying a trained natural language processing model to at least a portion of the word embeddings and the at least one entity. The method may also include transmitting the item description in response to the item description request.

In some examples, determining at least one entity comprises applying a bi-directional long short term memory neural network model to the word embeddings to generate a context vector, applying an attention model to the context vector to generate attention values, and applying a conditional random field model to the attention values to determine sequence tags for the word embeddings. In some examples, the method comprises determining attributes within the context vector based on the sequence tags, and replacing the attributes with tokens, wherein the trained natural language processing model is trained to keep the tokens, and generating the item description comprises replacing the tokens with corresponding attributes.

In some examples, the method comprises training the natural language processing model with a corpus comprising item titles for a plurality of items. In some examples, the method comprises generating a sentence embedding, a token embedding, and a position embedding based on each of the item titles, and training the natural language processing model with the generated sentence embeddings, token embeddings, and position embeddings.

In some examples, a non-transitory computer readable medium having instructions stored thereon, wherein the instructions, when executed by at least one processor, cause a device to perform operations comprising receiving an item description request, and generating word embeddings based on the item description request. The operations may also comprise determining at least one entity based on application of a neural network to the word embeddings, generating an item description based on applying a trained natural language processing model to at least a portion of the word embeddings and the at least one entity, and transmitting the item description in response to the item description request.

In some examples, the operations comprise applying a bi-directional long short term memory neural network model to the word embeddings to generate a context vector, applying an attention model to the context vector to generate attention values, and applying a conditional random field model to the attention values to determine sequence tags for the word embeddings. In some examples, the operations comprise determining attributes within the context vector based on the sequence tags, replacing the attributes with tokens, wherein the trained natural language processing model is trained to keep the tokens, and generating the item description comprises replacing the tokens with corresponding attributes.

In some examples, the operations comprise training the natural language processing model with a corpus comprising item titles for a plurality of items. In some examples, the operations comprise generating a sentence embedding, a token embedding, and a position embedding based on each of the item titles, and training the natural language processing model with the generated sentence embeddings, token embeddings, and position embeddings.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two.

The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
generate a sentence embedding, a token embedding, and a position embedding based on each of item titles for a plurality of items;
train a natural language processing model with the sentence embeddings, the token embeddings, and the position embeddings;
receive an item description request;
generate word embeddings based on the item description request;
determine at least one entity based on application of a neural network to the word embeddings;
generate an item description based on applying the trained natural language processing model to at least a portion of the word embeddings and the at least one entity; and
transmit the item description in response to the item description request.

2. The system of claim 1, wherein determining at least one entity comprises:
applying a bi-directional long short term memory neural network model to the word embeddings to generate a context vector;
applying an attention model to the context vector to generate attention values; and
applying a conditional random field model to the attention values to determine sequence tags for the word embeddings.

3. The system of claim 2, wherein the computing device is configured to:
determine attributes within the context vector based on the sequence tags; and
replace the attributes with tokens.

4. The system of claim 3, wherein generating the item description comprises replacing the tokens with the corresponding attributes.

5. The system of claim 3, wherein the trained natural language processing model is trained to keep the tokens.

6. The system of claim 1, wherein the computing device is configured to randomly mask a portion of the item titles to train the natural language processing model.

7. The system of claim 1, wherein the computing device is configured to obtain an item title from a data repository in response to the item description request, wherein the word embeddings are generated based on the item title.

8. The system of claim 1, wherein the item request comprises textual data converted from audio.

9. A method comprising:
generating a sentence embedding, a token embedding, and a position embedding based on each of item titles for a plurality of items;
training a natural language processing model with the sentence embeddings, the token embeddings, and the position embeddings;
receiving an item description request;
generating word embeddings based on the item description request;
determining at least one entity based on application of a neural network to the word embeddings;
generating an item description based on applying the trained natural language processing model to at least a portion of the word embeddings and the at least one entity; and
transmitting the item description in response to the item description request.

10. The method of claim 9, wherein determining at least one entity comprises:
applying a bi-directional long short term memory neural network model to the word embeddings to generate a context vector;
applying an attention model to the context vector to generate attention values; and
applying a conditional random field model to the attention values to determine sequence tags for the word embeddings.

11. The method of claim 10, comprising:
determining attributes within the context vector based on the sequence tags; and
replacing the attributes with tokens, wherein the trained natural language processing model is trained to keep the tokens, and generating the item description comprises replacing the tokens with corresponding attributes.

12. A non-transitory computer readable medium having instructions stored thereon, wherein the instructions, when executed by at least one processor, cause a device to perform operations comprising:
generating a sentence embedding, a token embedding, and a position embedding based on each of item titles for a plurality of items;
training a natural language processing model with the sentence embeddings, the token embeddings, and the position embeddings;
receiving an item description request;
generating word embeddings based on the item description request;
determining at least one entity based on application of a neural network to the word embeddings;
generating an item description based on applying the trained natural language processing model to at least a portion of the word embeddings and the at least one entity; and
transmitting the item description in response to the item description request.

13. The non-transitory computer readable medium of claim 12, wherein determining at least one entity comprises:
applying a bi-directional long short term memory neural network model to the word embeddings to generate a context vector;

applying an attention model to the context vector to generate attention values; and applying a conditional random field model to the attention values to determine sequence tags for the word embeddings.

14. The non-transitory computer readable medium of claim 13 further comprising instructions stored thereon that, when executed by at least one processor, further cause the device to perform operations comprising:

determining attributes within the context vector based on the sequence tags; and replacing the attributes with tokens, wherein the trained natural language processing model is trained to keep the tokens, and generating the item description comprises replacing the tokens with corresponding attributes.

* * * * *